C. G. DELANO.
AUTOMOBILE MOWING MACHINE.
APPLICATION FILED OCT. 27, 1909.

957,660.

Patented May 10, 1910.

WITNESSES
J.A. Brophy

INVENTOR
Charles G. Delano
BY
ATTORNEYS

C. G. DELANO.
AUTOMOBILE MOWING MACHINE.
APPLICATION FILED OCT. 27, 1909.

957,660.

Patented May 10, 1910.
5 SHEETS—SHEET 4.

WITNESSES
J. A. Brophy
[signature]

INVENTOR
Charles G. Delano
BY
[signature]
ATTORNEYS

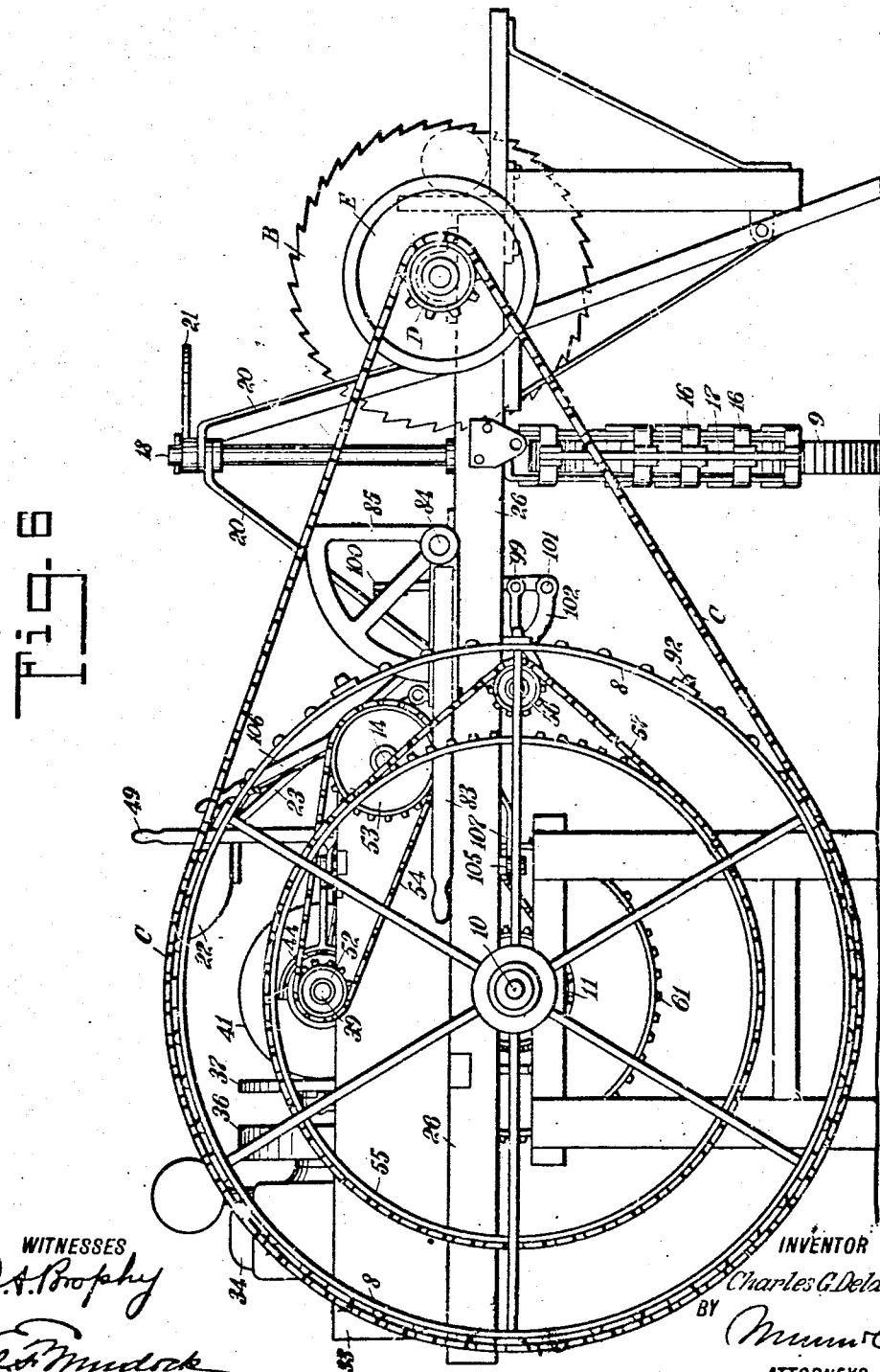

UNITED STATES PATENT OFFICE.

CHARLES G. DELANO, OF BERKLEY, MASSACHUSETTS.

AUTOMOBILE MOWING-MACHINE.

957,660.   Specification of Letters Patent.   Patented May 10, 1910.

Application filed October 27, 1909. Serial No. 524,823.

*To all whom it may concern:*

Be it known that I, CHARLES G. DELANO, a citizen of the United States, and residing in the town of Berkley, in the county of Bristol and State of Massachusetts, have invented a certain new and useful Automobile Mowing-Machine, of which the following is a full, clear, and exact description.

Among the principal objects which the present invention has in view are: to provide a mechanism for propelling and operating a mowing machine by power: to provide traction mechanism for said mowing machine adapted to be guided in the rear of the cutter bar: to provide a mowing mechanism disposed in operative position in advance of the traction mechanism, and substantially in line therewith, to avoid side drag: to provide means for lifting the cutter bar off the surface of the ground to avoid obstacles thereon: to provide a traction mechanism which may be utilized for miscellaneous power purposes: and to provide a suitable reciprocating mechanism for the knives of the cutter bar and operating connections therewith.

One embodiment of the present invention is disclosed in the construction illustrated in the accompanying drawings, forming a part of this specification, in which—

Figure 1:
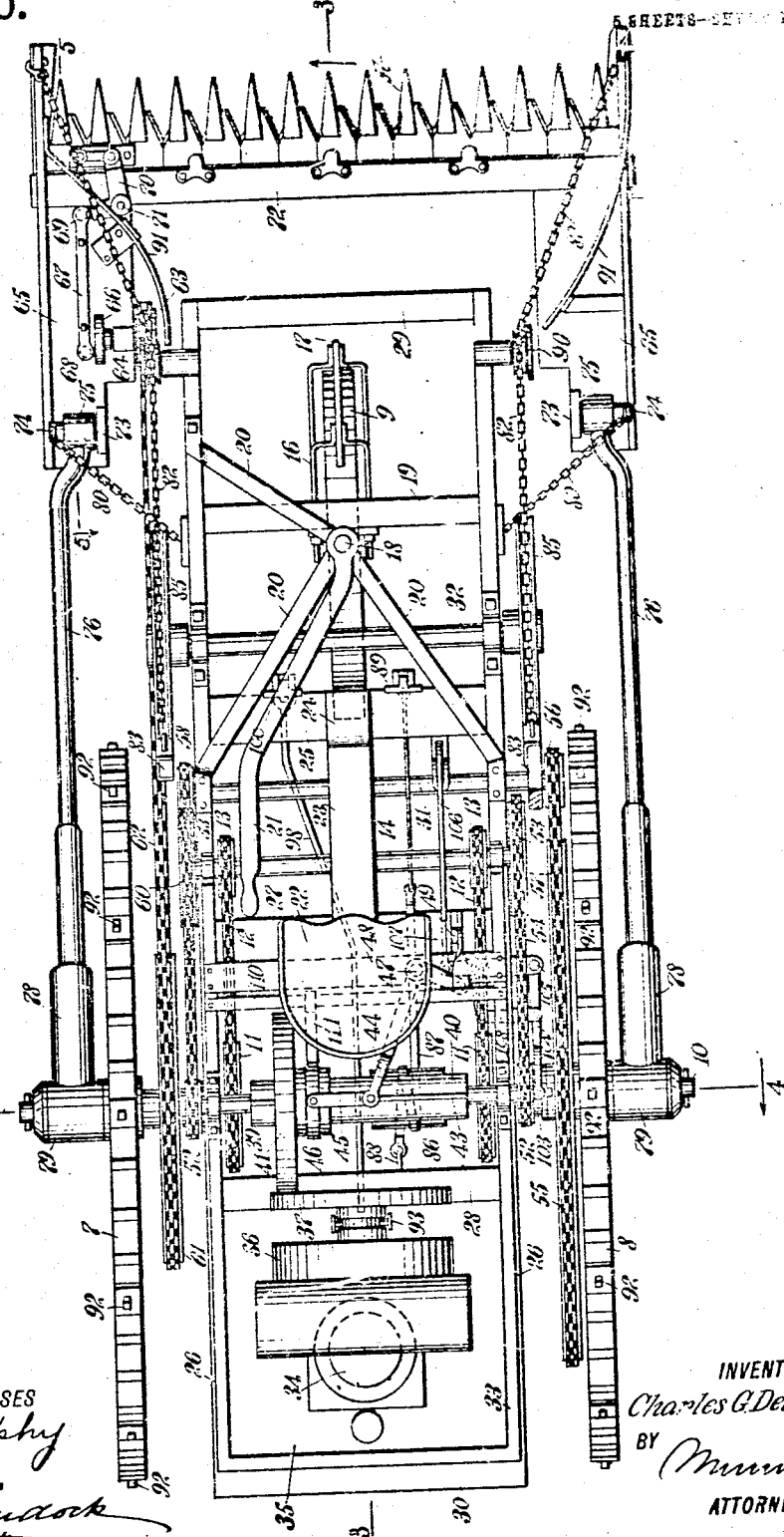
Figure 2:
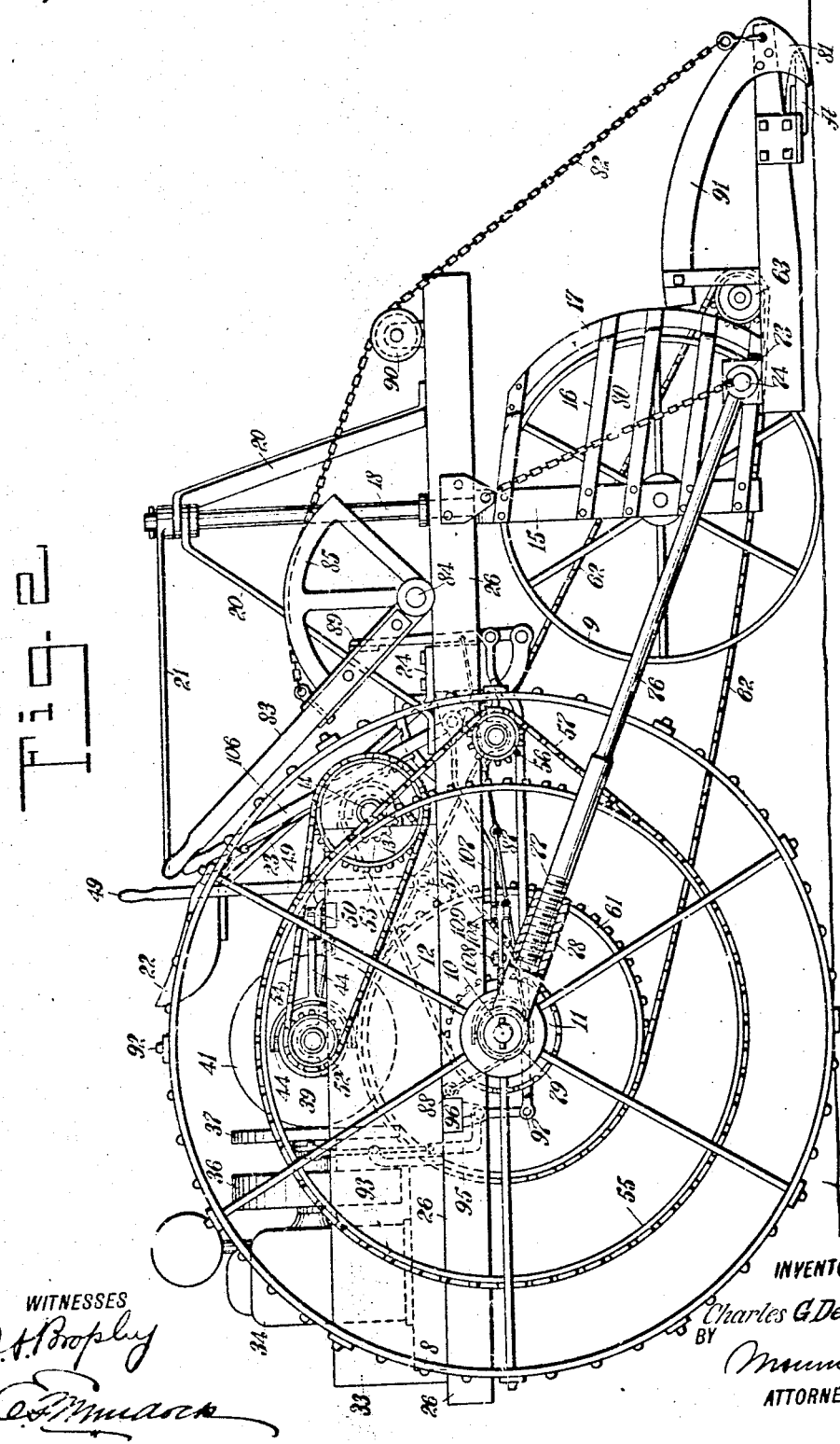
Figure 3:
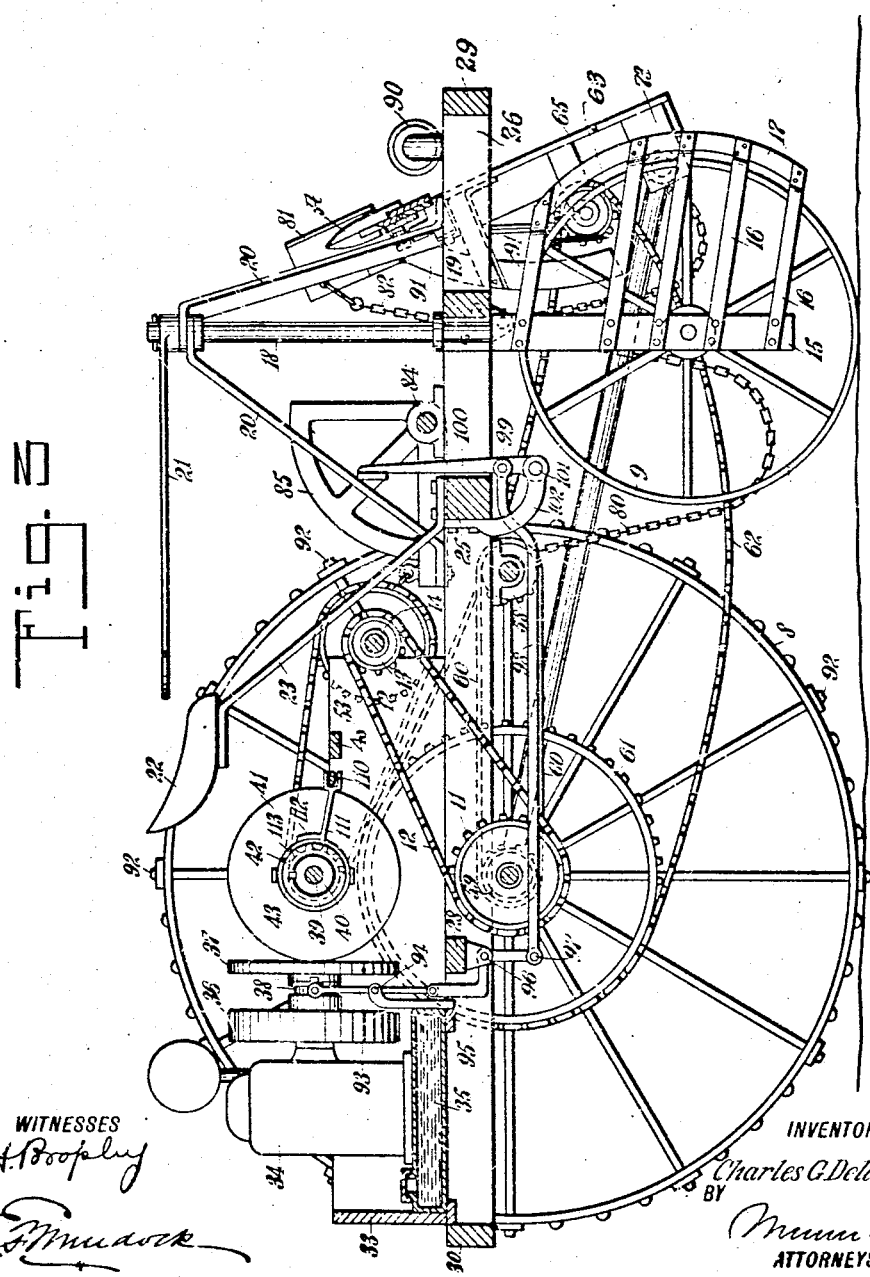
Figure 4:
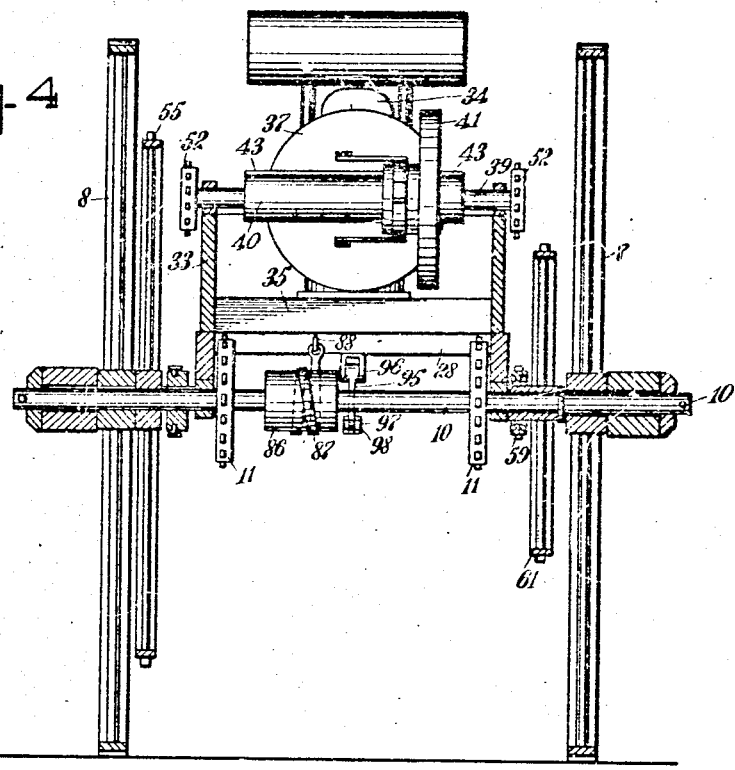
Figure 5:
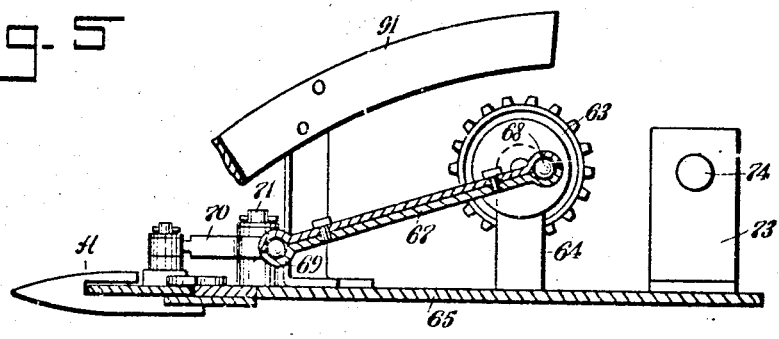

Figure 1 is a plan view of a mowing machine constructed and arranged in accordance with the present invention; Fig. 2 is a side elevation of the same; Fig. 3 is a longitudinal section, taken on the line 3—3 in Fig. 1, the cutter bar and pivotal mounting of the same being shown in raised position; Fig. 4 is a cross section of the traction mechanism, taken on the line 4—4 in Fig. 1; Fig. 5 is an enlarged detail view in vertical section taken on the line 5—5 in Fig. 1, of the cutter bar and structural mounting therefor; and Fig. 6 is a side elevation of the traction mechanism, showing the application of the same as a stationary motor for operating a rotary saw.

The traction mechanism shown in the accompanying drawings is mounted upon three wheels 7, 8, and 9. The traction wheel 8 is fixedly mounted upon the axle 10, and the wheel 7 is loosely mounted upon the axle 10. Upon the said axle 10 are fixedly mounted large sprocket wheels 11, 11, which are connected by means of the chains 12, 12, to the sprockets 13, 13, on the cutter shaft 14, from which the power is transmitted from what may be termed the motor mechanism to the traction mechanism.

The wheel 9 is mounted in yoke arms 15, from which are forwardly extended supports 16, 16, to hold in position the guard 17. The wheel 9 is provided with a vertical shaft 18 which forms pivotal bearings in the cross brace 19 and the triangular braces 20, 20. To the upper end of the shaft 18 is fixedly secured a lever 21, which is extended and arranged with reference to the driver's seat 22. The seat 22 is mounted on a leaf spring 23, which is fixedly secured at 24 upon the cross brace 25 of the carrying frame.

The carrying frame of the present machine is an elongated body, having parallel side members 26, 26, joined transversely by the braces 19, 25, 27, 28, 29 and 30. In suitable bearing boxes mounted in the side members 26, 26, of said body, is mounted the axle 10, the cutter shaft 14, above referred to, the cutter shaft 31, and the rocking shaft 32. Erected upon the sides 26, 26, and the rear cross brace 30 is a box frame 33, in which is mounted a suitable internal combustion engine 34, the base 35 forming a water tank, substantially as shown at Fig. 3 of drawings.

The motor mechanism for operating the traction mechanism comprises the motor 34, which is provided with a fly wheel 36 and a friction disk 37, on the driving shaft of the said motor, the disk being loosely mounted thereon. Mounted in a suitable feather or spline on the driving shaft of the motor is a clutch 38 whereby the disk 37 is alternately engaged and disengaged with and from the driving shaft of the motor 34.

Mounted fixedly on the shaft 39 is a sleeve 40, provided to carry a friction wheel 41. The friction wheel 41 is provided with a suitable elongated and grooved hub 42, which is slidably mounted upon the said sleeve, and guided thereon by a long feather or spline 43.

The friction wheel 41 is held in frictional contact with the disk 37, the face of the said disk and the periphery of the said wheel being covered with a suitable material to cause frictional engagement between the two surfaces. By shifting the said wheel from the outer edge of the said disk inward to the dead center of the said disk, the rotary speed imparted to the disk 41 may be regulated from the greatest possible speed to a stationary position. This shifting of the wheel 41 is accomplished by the lever 44, which is connected by means of the link 45 and the collar 46, with the said wheel 41.

The lever 44 is pivoted at 47 to the framing member 48. The lever 44 is a lever of the bell crank type, and is connected at the short end to the lever 49, by a link 50. The lever 49 is pivoted at 51 in bearings mounted on the brace 27. Any suitable detent mechanism, such as a quadrant, or pawl and ratchet mechanism, not herein shown, may be used to hold this lever 49 in position.

By means of the mechanism just above described embodying the motor, disk 37, wheel 41, and shifting mechanism connected therewith, the shaft 39 is rotated at a speed regulated and controlled by the operator or driver of the machine. Mounted fixedly upon the shaft 39 are sprocket wheels 52—52. The sprocket wheels 52 are alined and connected with sprocket wheels 53, 53, by the chains 54. The wheels 53 are fixedly mounted upon the counter shaft 14. The counter shaft 14 is provided with suitable bearings formed on the end of the box frame 35, and has fixedly secured thereon, as before stated, the sprocket wheels 13, 13, which, by means of the chains 12, 12, and the sprockets 11, 11, are operatively engaged with the axle 10. By the means just described, the motor mechanism may be utilized for operating the traction mechanism through the axle 10, and the wheels 7 and 8. The wheel 8 has mounted on the hub thereof, a large sprocket wheel 55. This large sprocket wheel 55 is operatively engaged with a small sprocket wheel 56, by means of the driving chain 57. The small sprocket wheel 56 is fixedly mounted upon the cutter shaft 31, at the opposite end of which is fixedly secured a sprocket wheel 58. The sprocket wheel 58 is alined and connected with the sprocket wheel 59 by means of the chain 60. The sprocket wheel 59 is fixedly attached to the same hub carrying the large sprocket 61. The hub carrying the sprockets 59 and 61 is loosely mounted upon the axle 10. The sprocket 61 drives the chain 62 which passes over and engages in operative relation, a sprocket 63 mounted in a standard 64 extending upward from the carrying frame 65 of the cutter bar. By means of the transmission mechanism just above described, the wheel 63 and shaft connected therewith, are rotated by the rotation of the traction wheel 8. While there is here described an arrangement whereby the rotary motion is thus imparted to the wheel 63, it will be understood that when the mechanism is used for other than mowing purposes, the chain 62 may be used as a driver for some other and suitable connection. In the present instance the wheel 63 is fixedly attached upon the shaft passing through the standard 64 and having a bearing therein, and provided on the opposite end with a disk 66, set out from which is a crank head, engaging the pitman 67. The pitman 67 is provided with a socket, at each end, to engage the pawl-like extensions 68, 69, formed in the ends of the crank on the disk 66, and in the end of the bell crank lever 70. The bell crank lever 70 is pivoted at 71 on the cross bar 72 of the cutter bar.

The cutter bar is in construction and arrangement very similar to the usual cutter bars used on mechanical mowers, the operation of the knives and finger guards being in all essentials the same. In the present instance the carrying frame differs in that the frames 65, 65, are extended rearwardly from the cutter bar at a distance exceeding the usual construction.

Extended upwardly from the frames 65, 65, are brackets 73, 73, laterally extended from which are pivot shafts 74, 74. The pivot shafts 74, 74, are provided to receive and hold the collars 75, 75, which are provided on the forward ends of the arms 76, 76. The arms 76 are provided with the screw threaded ends 77, which are held in the sockets 78, 78. The sockets 78, 78, are provided with collars 79, 79. By rotating the arms 76, 76, the distance between the pivot shafts 74 and the axle 10 may be varied, thereby taking up any slack which may occur in the chain 82.

The rear end or heel of the carrying frame is supported by the chains 80. The forward end of the cutter bar is supported on the runners 81, the chain 82, when in operative position being slacked to allow the runners 81 to bear on the surface of the ground. The chain 82 is connected to a lever 83, which is mounted in pivotal bearings at 84 in the side members 26. Attached to the lever 83 is a quadrant 85, in a groove in the periphery of which is threaded the chain 82, when the lever is thrown back to raise the cutter bar from the ground to pass over any obstacles.

The clutch 38 is grooved as shown in Fig. 3 of drawings, and is operated by the yoke lever 93, which is pivoted at 94. The yoke lever 93 is connected at the free end to the bell crank 95, which is pivoted at 96 on the under side of the brace 28. The lever 95 is pivotally connected at 97 to the connecting rod 98. The rod 98 is pivotally connected at 99 to a foot lever 100. The foot lever 100 is pivotally mounted at 101 upon the bracket 102. The lever 100 stands above the brace 25 in position to be operated by the foot of the operator. The train of levers thus described is arranged to operate in such manner that when the foot of the operator forces the lever 100 away from the seat 22, the yoke lever 93 forces the clutch 38 from the disk 37, thereby arresting the transmission of the motive power to both the traction and other operation of the machine.

The wheel 55 as above stated, is mounted upon the hub of the wheel 8. This mounting permits the wheel 55 to run free except when engaged by the clutch 103. When the clutch 103 is thrown into engagement by the lever 104, the transmission of the driving force from the wheel 8 is as above described.

The lever 104 is pivoted at 105 upon an arm extended from the side of the body of the machine. The yoke end of the lever 104 is moved laterally by the hand-operated lever 106, which is located conveniently to the seat 22. The lower end of the lever 106 is connected by a rod 107, and bell crank 108 with the lever 104, as illustrated in Fig. 1 of drawings. The bell crank 108 is pivoted in the brace 109.

By means of the clutch 103 and the mechanism for operating the same, as above described, the driving mechanism for operating the mowing machine or other operating devices connected with the wheel 61, may be arrested or started without stopping or altering the operating of the traction mechanism.

To compensate for any spring in the shaft 39, or the sleeve 40, which would loosen the contact of the wheel 41 upon the disk 37, I have provided the cross bar 110, which is fixedly secured to the upper edge of the frame 33, and extended in parallel arrangement to the shaft 39. Slidably mounted upon the said cross bar 110 is an arm 111, the forward end of which is provided with a presser foot 112, as seen best in Fig. 3 of the drawings. The presser foot is fixedly connected with a ring 113, which is held permanently by the hub of the wheel 41, and in such relation thereto that, as the said wheel 41 is shifted laterally, the arm 111 is slid therewith on the bar 110.

With a machine thus constructed the operation is as follows: By depressing the lever 83 from the position shown in Fig. 2 the cutter bar A may be raised. When proceeding to the field where the machine is to be operated, the cutter bar is lifted until it rests in the position shown in Fig. 3 of drawings. The chain 62 is removed from the sprocket 61 to avoid unnecessary entanglement of the operative parts. The machine is now operated as an automobile, the motor being started with the wheel 41 disposed in the center of the disk 37, and remaining immovable in consequence thereof. The driver having taken his seat, he, by means of the lever 49 moves the wheel 41 slowly from the center toward the periphery of the disk 37. The wheel 41 is rotated by the disk 37 as soon as the said wheel passes beyond the dead center thereof. The rotation is gradually increased in the wheel 41, as the same is advanced toward the periphery of the wheel 37. Through the wheel 41 the shaft 39 is rotated. Connected operatively with the shaft 39 is the cutter shaft 14. Connected with the cutter shaft 14 is the axle 10, and the wheel 8. By means of this connection, the wheel 8 is rotated, driving the machine as an automobile. During its progress as an automobile, the operator steers the machine by means of the lever 31, turning the wheel 9 on its pivotal shaft 18. The wheel 7 being loosely mounted on the axle 10 differentiates with the wheels 8 and 9 to accommodate the action in following any curved path.

It will be understood that the speed may be varied by shifting the wheel 41 nearer the outer periphery of the disk 37 or toward the dead center thereof. It will also be understood that if the wheel 41 be carried to the side of the disk 37 other than that which produces the forward rotation of the wheel 41, and parts connected therewith, a reverse or backward rotation will be imparted thereto.

To check the movement of the machine I have provided the same with a brake drum 86 fixedly mounted on the axle 10, and about which I wind a strap 87. The strap 87 is anchored at 88 to the brace 28, and at the free end to a foot lever 89, which is mounted in the brace 25. The operator may, by pressing upon the foot pedal, at any time tighten the strap upon the drum 86, thereby arresting the rotation of the axle 10, and arresting the traction of the machine.

Arriving at the field of operation, and having placed the machine in position, the cutter bar A and frame thereof, are dropped from the position shown in Fig. 3 to the position shown in Fig. 2. The chain 82 is threaded over the pulleys 90. The chain 62 is adjusted upon the wheels 61 and 63. The mowing machine is now in position to be operated. The motor is again started, if it has been stopped, and the driver having resumed his seat, operates the lever 49 to impel the machine forward as above described. Now, however, the transmission of the rotary action of the wheel 8 is conveyed to the knife bar of the cutter bar A, through the wheels 55, 56, 58, 59, 61, 63, and the crank disk 66, pitman 67, and bell crank 70, and the chains 57, 60, and 62. In the operation of the mowing machine in this conjunction, it will be observed that the driver or operator sits directly in the path of the cutter bar, and in a position where every obstacle can be by him seen. Should such an obstacle as a hillock, stump, or boulder be disclosed in the path of the cutter bar, which is not too great for the same to be lifted over, he may by depressing the lever 83, raise the forward end of the carrying frame 65, to lift the bar over the obstruction.

In the operation of the mowing machine I have provided the fenders 91, 91, which are arranged to extend in front of the wheel 63, and chain carried thereby on the one side, and to deflect the cut straw to the center of the machine out of the path of the oncoming traction wheels 7 and 8, thus preventing damage to the material being handled, by the said wheels forcing the same into the ground.

I have illustrated in Fig. 6 of the drawings an adaptation of the machine to a use different from that in driving a mowing machine. The use to which I have shown the application is that of driving a rotary saw B. In driving the saw B where the greatest speed is desired, I have threaded the chain C, about the periphery of the wheel 8, the sprocket lugs 92 being provided thereon to engage the said chain C. With a saw thus mounted having a small sprocket D, I provide a heavy wheel E to steady the action of the saw. The saw may be mounted in any suitable manner and in bearings provided in the side members 26, 26, as shown in Fig. 6 of drawings, or in a detached structure.

When the machine is utilized for the purpose of driving a saw or other use of a similar character, unconnected with the need of a traction mechanism, the traction mechanism is raised until the wheel 8 is lifted from surface contact with the ground, as shown in Fig. 6 of drawings.

It will be understood that for almost any purpose of rough runabout for cartage, hauling, or for stationary motor uses, this machine is well adapted.

Having thus described my invention, I claim as new and desire to secure by Letters Patent:

1. An automobile mowing machine comprising an elongated rectangular carrying body; an axle rotatably mounted in said body; carrying wheels mounted on said axle, one of said wheels being fixed thereon; a reciprocating cutter bar disposed in front of and in the path of said wheels; a plurality of carrying arms for said cutter bar embodying separable sections adjustable lengthwise; a motor carried on said body; a transmission mechanism operatively connecting said wheels and cutter bar and said motor; and a clutch mechanism for engaging and disengaging said motor.

2. An automobile mowing machine comprising an elongated rectangular carrying body; an axle rotatably mounted in said body; carrying wheels mounted on said axle, one of said wheels being fixed thereon; a reciprocating cutter bar disposed in front of and in the path of said wheels; a plurality of carrying arms for said cutter bar pivotally attached thereto, and having screw threaded ends; pivotal mountings for said arms having collars to engage the said axle and screw threaded sockets to engage said threaded ends of said arms; a motor carried on said body; a transmission mechanism operatively connecting said wheels and cutter bar and said motor; and a clutch mechanism for engaging and disengaging said motor.

3. An automobile mowing machine comprising an elongated rectangular carrying body; an axle rotatably mounted in said body; carrying wheels mounted on said axle, one of said wheels being fixed thereon; a reciprocating cutter bar disposed in front of said cutter bar extended to the rear thereof, and in the path of said wheels; a carrier for and having supporting devices adapted to slide on the surface of the ground; a plurality of carrying arms for said cutter bar pivotally attached thereto and having screw threaded ends; pivotal mountings for said arms having collars to engage the said axle and screw threaded sockets to engage said threaded ends of said arms; a motor carried on said body; a transmission mechanism operatively connecting said wheels and cutter bar and said motor; and a clutch mechanism for engaging and disengaging said motor.

4. An automobile mowing machine comprising an elongated rectangular carrying body; an axle rotatably mounted in said body; carrying wheels mounted on said axle, one of said wheels being fixed thereon; a reciprocating cutter bar disposed in front of and in the path of said wheels; a carrier for said cutter bar extended to the rear thereof, and having supporting devices adapted to slide on the surface of the ground; guards mounted on said carrier at the rear of said cutter bar to deflect the straw from the path of said wheels; a plurality of carrying arms for said cutter bar pivotally attached thereto and having screw threaded ends; pivotal mountings for said arms having collars to engage the said axle and screw threaded sockets to engage said threaded ends of said arms; a motor carried on said body; a transmission mechanism operatively connecting said wheels and cutter bar and said motor; and a clutch mechanism for engaging and disengaging said motor.

5. An automobile mowing machine comprising an elongated rectangular carrying body; an axle rotatably mounted in said body; carrying wheels mounted on said axle, one of said wheels being fixed thereon; a reciprocating cutter bar disposed in front of and in the path of said wheels; a carrier for said cutter bar extended to the rear thereof and having supporting devices adapted to slide on the surface of the ground; inwardly inclined guards mounted on said carrier at the rear of said bar, to deflect the straw inwardly between the said wheels; a plurality of carrying arms for said cutter bar pivotally attached thereto and having screw threaded ends; pivotal mountings for said arms having collars to engage the said axle and screw threaded sockets to engage said threaded ends of said arms; a motor carried on said body; a transmission mechanism operatively connecting said wheels and cutter bar and said motor; and a clutch mechanism for engaging and disengaging said motor.

In testimony whereof I have signed my name to this specification in the presence of two subscribing witnesses.

CHARLES G. DELANO.

Witnesses:
ALBERT R. WHITE, 2nd,
GRACE M. NALLAHAN.